United States Patent
Bae et al.

(10) Patent No.: US 12,502,329 B2
(45) Date of Patent: Dec. 23, 2025

(54) UPPER ARM MODULE OF WEARABLE MUSCULAR STRENGTH ASSISTING APPARATUS AND WEARABLE MUSCULAR STRENGTH ASSISTING APPARATUS INCLUDING SAME

(71) Applicants: Hyundai Motor Company, Seoul (KR); Kia Corporation, Seoul (KR)

(72) Inventors: Ki Hyeon Bae, Seoul (KR); Hyun Seop Lim, Seoul (KR); Beom Su Kim, Seoul (KR); Ju Young Yoon, Seoul (KR); Kyu Jung Kim, Seoul (KR); Dong Jin Hyun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 81 days.

(21) Appl. No.: 18/736,973

(22) Filed: Jun. 7, 2024

(65) Prior Publication Data

US 2024/0315909 A1    Sep. 26, 2024

Related U.S. Application Data

(62) Division of application No. 16/691,524, filed on Nov. 21, 2019, now Pat. No. 12,029,698.

(30) Foreign Application Priority Data

Apr. 4, 2019   (KR) .................... 10-2019-0039683

(51) Int. Cl.
*A61H 1/00* (2006.01)
*A61H 1/02* (2006.01)

(52) U.S. Cl.
CPC ......... *A61H 1/0281* (2013.01); *A61H 1/0218* (2013.01); *A61H 2001/0207* (2013.01);
(Continued)

(58) Field of Classification Search
CPC .......... A61H 1/0274; A61H 1/00; A61H 1/02; A61H 1/0277; A61H 2201/1659;
(Continued)

(56) References Cited

U.S. PATENT DOCUMENTS 6,082,034 A    7/2000  Musmanno
7,410,338 B2   8/2008  Schiele et al.
(Continued)

FOREIGN PATENT DOCUMENTS

CN    105362040 A    3/2016
CN    109202956 A    1/2019
(Continued)

OTHER PUBLICATIONS

Notice of Allowance issued Jul. 12, 2024 in corresponding Chinese application No. 201911218507.3.
(Continued)

*Primary Examiner* — LaToya M Louis
(74) *Attorney, Agent, or Firm* — Fox Rothschild LLP

(57) ABSTRACT

An upper arm module of a wearable muscular strength assisting apparatus is provided. The upper arm module includes a base part configured to be connected to a wearer's body, and an upper arm part having a first end thereof coupled to the base part to be rotatable about a fixed point. The upper arm part is coupled to the wearer's upper arm to apply a torque thereto. The upper arm module further includes an elastic body having a first end thereof fixedly coupled to the upper arm part and generating an elastic force by deformation. In particular, the upper arm module also includes a first link having a first end thereof rotatably coupled to the base part at a point of application, and a second link rotatably coupled to the second end of the first link at a first point.

4 Claims, 9 Drawing Sheets

(52) U.S. Cl.
CPC ............... *A61H 2201/1614* (2013.01); *A61H 2201/1635* (2013.01)

(58) Field of Classification Search
CPC ...... A61H 2201/165; A61H 2201/0107; A61H 2201/0157; A61H 2201/018; A61H 2201/12; A61H 2201/14; A61H 2201/1436; A61H 2201/1635; A61H 2201/1638; A61H 2201/1671; A61H 2201/1676; A61H 2201/5053; B25J 9/0006; B25J 9/06; B25J 9/08; B25J 9/14; B25J 9/106; B25J 9/109; B25J 9/1065

See application file for complete search history.

(56) References Cited

U.S. PATENT DOCUMENTS

| | | |
|---|---|---|
| 2003/0223844 A1 | 12/2003 | Schiele et al. |
| 2008/0009771 A1 | 1/2008 | Perry et al. |
| 2010/0217163 A1 | 8/2010 | Sankai |
| 2011/0164949 A1 | 7/2011 | Kim et al. |
| 2015/0076196 A1 | 3/2015 | Brown et al. |
| 2016/0081871 A1 | 3/2016 | Doyle |
| 2016/0339583 A1 | 11/2016 | Van Engelhoven et al. |
| 2017/0144309 A1 | 5/2017 | Sankai |
| 2017/0173783 A1 | 6/2017 | Angold et al. |
| 2018/0023758 A1 | 1/2018 | Bax et al. |
| 2019/0175435 A1 | 6/2019 | Sasaki et al. |
| 2019/0350794 A1 | 11/2019 | Angold et al. |

FOREIGN PATENT DOCUMENTS

| | | |
|---|---|---|
| JP | 4987148 B1 | 7/2012 |
| JP | 2018-001391 A | 1/2018 |
| KR | 10-1603162 B1 | 3/2016 |
| KR | 10-2016-0132156 A | 11/2016 |
| KR | 10-2017-0086862 A | 7/2017 |
| KR | 10-1896181 B1 | 9/2018 |
| TW | M268039 U | 6/2005 |
| WO | 2018/082906 A1 | 5/2018 |

OTHER PUBLICATIONS

An Kai et al., "Bending Shape of Space Manipulator with Flexible Link", Journal of Dynamics and Control, 14(1), pp. 1-5 (Feb. 2016)—English translation of Abstract only.

W. Gu et al., "Dynamic Simulation of Wearable Upper Limb Power Assisted Robot Based on Pneumatic Muscle", Journal of Chengde Petroleum College, 19(5), pp. 1-6 (2017)—English translation of Abstract only.

Office Action issued Sep. 26, 2023 in corresponding Japanese Patent Application No. 2019-208997.

UPPER ARM MODULE OF WEARABLE MUSCULAR STRENGTH ASSISTING APPARATUS AND WEARABLE MUSCULAR STRENGTH ASSISTING APPARATUS INCLUDING SAME

CROSS REFERENCE TO RELATED APPLICATION

The present application is a Division of U.S. patent application Ser. No. 16/691,524, filed Nov 21, 2019. which claims the benefit of priority to Korean Patent Application No. 10-2019- 0039683, filed Apr. 4, 2019, the entire contents of which is incorporated herein by this reference.

BACKGROUND

1. Field of the Invention

The present invention relates generally to an upper arm module of a wearable muscular strength assisting apparatus and a wearable muscular strength assisting apparatus including the same. More particularly, the present invention relates to an upper arm module for supporting a wearer's upper arm by compensating for a load due to gravity, and a wearable muscular strength assisting apparatus including the same.

2. Description of the Related Art

A wearable robot is a robot that assists the movement of a human body by putting the robot on a specific part of the body or by mounting the robot to a specific part, and is designed to be used for medical, military, or industrial purposes. In particular, wearable robots for work purposes are designed to prevent injuries and to support muscle strength by reducing the load applied to the worker. The wearable robot is a robot that is made by mimicking a wearer's exoskeleton, and it is the core of technology to design the joint to have the same motion as the actual motion of the body.

In particular, a wearable muscular strength assisting apparatus includes a manual support mechanism configured to support a person bearing the weight of a tool. A typical manual support mechanism is configured to compensate for gravity under a range of positions using a combination of structural elements, springs, cables, and pulleys. The configuration of these devices provides gravity compensation within a limited operating range.

However, the conventional wearable muscular strength assisting apparatus is problematic in that a torque profile is formed by combining a cam and a wire for the required torque profile, but the combination of the cam and the wire causes deterioration of assemblability and workability, and durability and noise problems occur due to friction and sliding between components.

The foregoing is intended merely to aid in the understanding of the background of the present invention, and is not intended to mean that the present invention falls within the purview of the related art that is already known to those skilled in the art.

SUMMARY

Accordingly, the present invention has been made to solve the above problems in the related art, and the present invention is intended to provide an upper arm module of a wearable muscular strength assisting apparatus and a wearable muscular strength assisting apparatus including the same, in which the durability and assemblability is improved by guiding a plurality of links without wires.

In order to achieve the above object, according to one aspect of the present invention, an upper arm module of a wearable muscular strength assisting apparatus may include a base part configured to be connected to a wearer's body and disposed to correspond to an upper end portion of a wearer's upper arm, and an upper arm part having a first end thereof coupled to the base part to be rotatable about a fixed point. The upper arm part may extend to correspond to the wearer's upper arm, and may be coupled to the wearer's upper arm to apply a torque to the wearer's upper arm. The upper arm module may further include an elastic body having a first end thereof fixedly coupled to the upper arm part at a position spaced apart from the first end of the upper arm part in an extension direction of the upper arm part, and the elastic body may generate an elastic force by deformation. The upper arm module may include a first link having a first end thereof rotatably coupled to the base part at a point of application spaced apart from the fixed point, and coupled to the upper arm part to allow movement of a second end thereof to be guided as the upper arm part is rotated about the fixed point. The upper arm module may also include a second link rotatably coupled to the second end of the first link at a first point, coupled to the upper arm part to allow movement of a second point spaced apart from the first point to be guided as the upper arm part is rotated about the fixed point, and coupled to a second end of the elastic body at a third point spaced apart from the first point and the second point.

The elastic body may be a spring having a first end thereof fixedly and rotatably coupled to the upper arm part, and a magnitude of the elastic force thereof may be varied in response to change in length due to movement of a second end thereof that is coupled to the third point of the second link. The point of application may be disposed in the base part at a position above the fixed point to allow a direction from the fixed point to the point of application may form an upward slope with respect to a ground.

The upper arm module may further include a third link disposed between the second link and the elastic body, and the third link may include a first end thereof rotatably coupled to the second link and a second end thereof coupled to the second end of the elastic body. The upper arm module may also include a fourth link disposed between the elastic body and the upper arm part, and the fourth link may include a first end thereof rotatably coupled to the upper arm part, and a second end thereof coupled to the first end of the elastic body.

The elastic body may include a plurality of springs with opposite ends thereof coupled to the third link and the fourth link, respectively, and the second end of the third link and the second end of the fourth link may extend along a direction in which the plurality of springs are disposed. The second link may be provided with a first sliding pin and a second sliding pin that protrude respectively from the first point and the second point toward the upper arm part, and the upper arm part may include a first sliding groove and a second sliding groove into which the first sliding pin and the second sliding pin are inserted respectively and slide to guide movement of the first point and the second point of the second link.

The torque generated by the elastic force of the elastic body may be varied as the upper arm part is rotated about the fixed point, and may have a profile in which a magnitude of the torque increases gradually as the upper arm part is rotated downward with respect to the base part, has a maximum value at a predetermined angle with respect to the ground, and then decreases again.

The third point of the second link may be disposed at a position higher or lower than a line that connects the first point and the second point to allow the first point, the second point, and the third point to form a triangle, and movement of the first point and the second point may be guided to cause the second link to be translated and rotated as the upper arm part is rotated about the fixed point. The third point of the second link may be disposed at a position higher than a line that connects the first point and the second point, and when the upper arm part is rotated downward more than a predetermined angle with respect to a ground based on the base part, movement of the first point and the second point may be guided to cause the third point to be moved downward. The third point of the second link may be disposed at a position higher than a line that connects the first point and the second point, the second point of the second link may be guided to be gradually more quickly oriented downward while being moved toward the fixed point, and the first point may be guided to be oriented downward and then oriented upward while being moved toward the fixed point.

The upper arm module may further include a rotatable part coupled to the base part to allow a relative rotation about the fixed point. The relative rotation of the rotatable part with respect to the base part may be restrained when locked by a locking mechanism, and the first link may be rotatably coupled to the rotatable part at the point of application to allow the first link and the upper arm part to be rotated simultaneously as the rotatable part is rotated with respect to the base part. The locking mechanism may allow the rotatable part to be locked to the base part at multiple rotation angle points. The base part and the upper arm part may further include a support provided at an outer side of the wearer's upper arm and extending to an inner side of the wearer's upper arm in the upper arm part to surround a lower portion of the wearer's upper arm.

In order to achieve the above object, according to another aspect of the present invention, a wearable muscular strength assisting apparatus may include the upper arm module, and the wearable muscular strength assisting apparatus that includes the base part coupled to a wearer's torso by a plurality of fastening mechanisms. The base part may be coupled to the plurality of fastening mechanisms to be rotatable about a rotating shaft that extends in a vertical direction of the wearer.

In order to achieve the above object, according to a further another aspect of the present invention, an upper arm module of a wearable muscular strength assisting apparatus may include a base part configured to be connected to a wearer's body and disposed to correspond to an upper end portion of a wearer's upper arm, and an upper arm part having a first end thereof coupled to the base part to be rotatable about a fixed point. The upper arm part may extend to correspond to the wearer's upper arm, and may be coupled to the wearer's upper arm to apply a torque to the wearer's upper arm. The upper arm module may further include an elastic body having a first end thereof fixedly coupled to the upper arm part at a position spaced apart from the first end of the upper arm part in an extension direction of the upper arm part, and the elastic body may generate an elastic force by deformation. In particular, the upper arm module may include a connecting link having a first end thereof rotatably coupled to the base part at a point of application that is spaced apart from the fixed point and a second end thereof coupled to a second end of the elastic body, and thereby a length of the elastic body may be varied as the upper arm part is rotated about the fixed point.

According to an upper arm module of a wearable muscular strength assisting apparatus and a wearable muscular strength assisting apparatus including the same according to the present invention, the configuration of the connecting links and the elastic body may provide a torque profile that varies the torque to rotate the upper arm part of the wearer upward based on the angle of the upper arm part. It is further advantageous in that it is possible to improve durability and assemblability by using links without using wires and cams.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
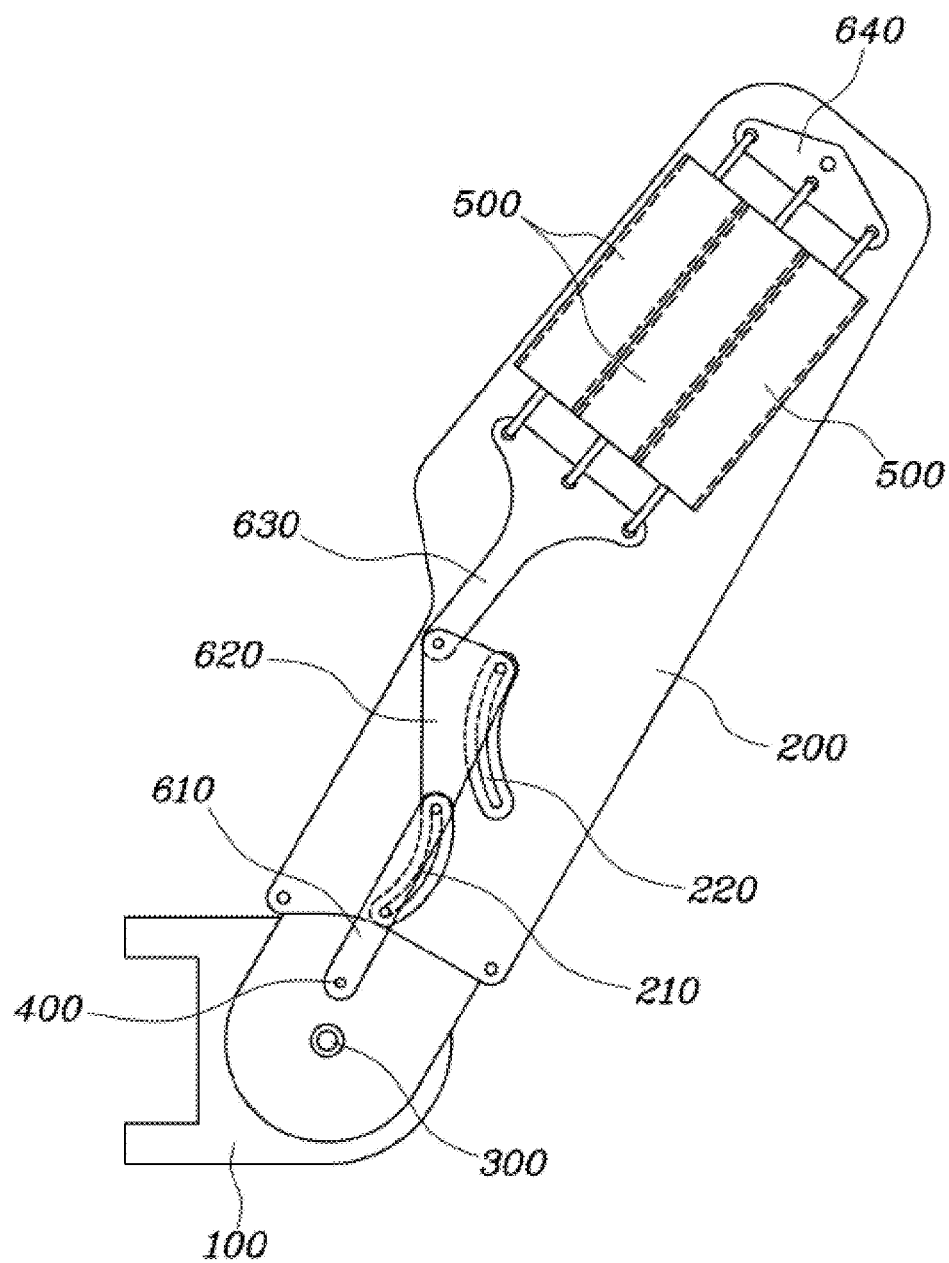
FIG. 1 is a front view showing the interior of an upper arm module of a wearable muscular strength assisting apparatus according to an exemplary embodiment of the present invention.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following description, the structural or functional description specified to exemplary embodiments according to the concept of the present invention is intended to describe the exemplary embodiments, so it should be understood that the present invention may be variously embodied, without being limited to the exemplary embodiments.

The exemplary embodiments according to the concept of the present invention may be variously modified and may have various shapes, so examples of which are illustrated in the accompanying drawings and will be described in detail with reference to the accompanying drawings. However, it should be understood that the exemplary embodiments according to the concept of the present invention are not limited to the exemplary embodiments which will be described hereinbelow with reference to the accompanying drawings, but various modifications, equivalents, additions and substitutions are possible, without departing from the scope and spirit of the invention.

It will be understood that, although the terms first, second, etc. may be used herein to describe various elements, these elements should not be limited by these terms. These terms are only used to distinguish one element, from another element. For instance, a first element discussed below may be termed a second element without departing from the teachings of the present invention. Similarly, the second element may also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Further, the terms used herein to describe a relationship between elements, for example, "between", "directly between", "adjacent" or "directly adjacent" should be interpreted in the same manner as those described above.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, an exemplary embodiment of the present invention will be described in detail with reference to the accompanying drawings. Throughout the drawings, the same reference numerals will refer to the same or like parts.

Figure 2:
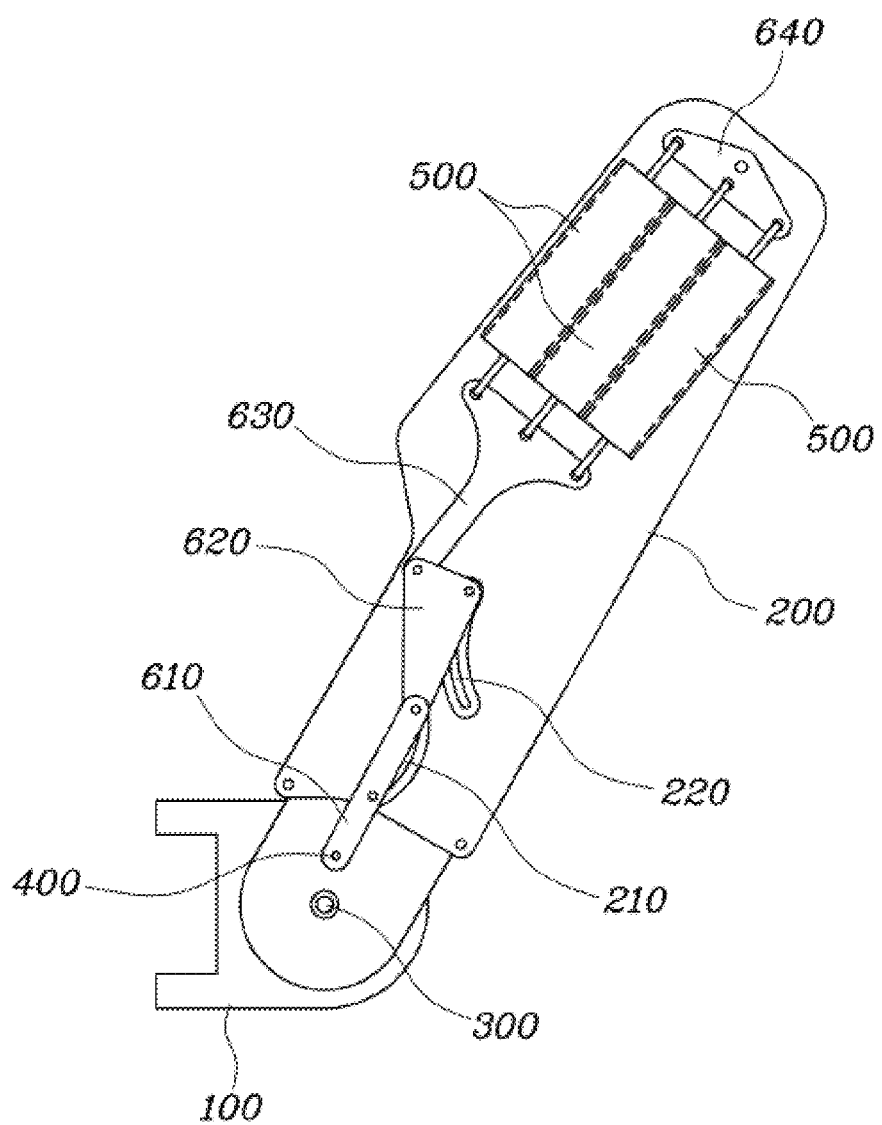
FIG. 2 is a perspective view showing the upper arm module of the wearable muscular strength assisting apparatus according to the exemplary embodiment of the present invention.

FIG. 1 is a front view showing the interior of an upper arm module of a wearable muscular strength assisting apparatus 1000 according to an exemplary embodiment of the present invention, and FIG. 2 is a perspective view showing the upper arm module of the wearable muscular strength assisting apparatus 1000 according to the exemplary embodiment of the present invention.

With reference to FIGS. 1 and 2, the upper arm module of the wearable muscular strength assisting apparatus 1000 according to the exemplary embodiment of the present invention may include a base part 100 configured to be connected to a wearer's body and disposed to correspond to an upper end portion of a wearer's upper arm, and an upper arm part 200 having a first end thereof coupled to the base part 100 to be rotatable about a fixed point 300. The upper arm part 200 may extend to correspond to the wearer's upper arm, and may be coupled to the wearer's upper arm to apply a torque to the wearer's upper arm. The upper arm module may further include an elastic body 500 having a first end thereof fixedly coupled to the upper arm part 200 at a position spaced apart from the first end of the upper arm part in an extension direction of the upper arm part 200 and generating an elastic force by deformation, and a connecting link 610, 620, 630, 640 having a first end thereof rotatably coupled to the base part 100 at the point of application 400 spaced apart from the fixed point 300 and a second end thereof coupled to a second end of the elastic body 500. In particular, a length of the elastic body 500 may be varied as the upper arm part 200 is rotated about the fixed point 300.

The base part 100 may be disposed at a shoulder of the wearer and may be disposed at the center of rotation of the wearer's upper arm to correspond to the upper end portion of the wearer's upper arm. The upper arm part 200 that corresponds to the wearer's upper arm may be coupled to the base part 100 to be rotatable about the fixed point 300 by being disposed at a side of the wearer's upper arm to simulate (e.g., mimic) motion of the wearer's upper arm rotating upward or downward about the upper end portion thereof.

The first end of the elastic body 500 may be coupled to the upper arm part 200, and particularly, may be fixed to the second end of the upper arm part 200 while being spaced apart in the extension direction of the upper arm part 200. The elastic body 500 may be deformed in length as the upper arm part 200 is rotated about the fixed point 300, and the elastic force generated thereby may be varied. The elastic body 500 may be configured to allow the elastic force to become zero at a predetermined rotation angle at which the upper arm part 200 is rotated about the fixed point 300, and a tensile force may be generated by the elastic force as the distance between the first end and the second end thereof increases.

In particular, the first end of the connecting link 610, 620, 630, 640 connected to the elastic body 500 may be rotatably coupled to the point of application 400 spaced apart from the fixed point 300, which is a center of rotation of the upper arm part 200. Accordingly, it is possible to vary the length of the elastic body 500 as the upper arm part 200 is rotated about the fixed point 300.

Thus, by the magnitude and the direction of the elastic force generated in the elastic body 500 as the upper arm part 200 is rotated about the fixed point 300 with respect to the base part 100, the torque applied to the base part 100 and the upper arm part 200 may be varied. More specifically, as shown in FIG. 1, in the base part 100, a torque ($\tau=(r)\times(F)=|r||F|\sin\theta$) in a downward rotational direction is generated, and as a reaction thereto, a torque in an upward rotational direction is generated in the upper arm part 200 with the same magnitude.

Accordingly, with the configuration of the connecting link 610, 620, 630, 640, and the elastic body 500, it is possible to generate a torque that rotates the upper arm part 200 of the wearer upwardly, and it is possible to form a torque profile to vary the torque based on the angle of the upper arm part 200. In particular, durability and assemblability may be improved by using the links without using wires and cams.

More specifically, the connecting link 610, 620, 630, 640 may include a first link 610 having a first end thereof rotatably coupled to the base part 100 at the point of application 400 that is spaced apart from the fixed point 300, and coupled to the upper arm part 200 to allow movement of a second end thereof to be guided as the upper arm part 200 is rotated about the fixed point 300. A second link 620 may be rotatably coupled to the second end of the first link 610 at a first point, coupled to the upper arm part 200 to allow movement of a second point that is spaced apart from the first point to be guided as the upper arm part 200 is rotated about the fixed point 300, and coupled to the second end of the elastic body 500 at a third point that is spaced apart from the first point and the second point.

In other words, the upper arm module of the wearable muscular strength assisting apparatus 1000 according to the exemplary embodiment of the present invention may include a base part 100 configured to be connected to a wearer's body, and disposed to correspond to an upper end portion of a wearer's upper arm; an upper arm part 200 having a first end thereof coupled to the base part 100 to be rotatable about a fixed point 300, extending to correspond to the wearer's upper arm, and coupled to the wearer's upper arm to apply a torque to the wearer's upper arm; an elastic body 500 having a first end thereof fixedly coupled to the upper arm part 200 at a position spaced apart from the first end of the upper arm part in an extension direction of the upper arm part 200, and generating an elastic force by deformation; a first link 610 having a first end thereof rotatably coupled to the base part 100 at the point of application 400 spaced apart from the fixed point 300, and coupled to the upper arm part 200 to allow movement of a second end thereof to be guided as the upper arm part 200 is rotated about the fixed point 300; and a second link 620 rotatably coupled to the second end of the first link 610 at a first point, coupled to the upper arm part 200 to allow movement of a second point spaced apart from the first point to be guided as the upper arm part 200 is rotated about the fixed point 300, and coupled to the second end of the elastic body 500 at a third point that is spaced apart from the first point and the second point.

The first end of the first link 610 may be rotatably coupled to the base part 100 at the point of application 400, and the second end thereof may be coupled to the upper arm part 200 to allow the movement thereof to be guided. The first link 610 may extend in an extension direction of the upper arm part 200. In particular, since the point of application 400 is disposed to be spaced apart from the fixed point 300, when the upper arm part 200 is rotated about the fixed point 300 with respect to the base part 100, the first end of the first link 610 may be rotated around the point of application 400, and thereby the movement of the second end of the first link 610 may be guided while the distance from the fixed point 300 is varied.

The second link 620 may be rotatably coupled to the second end of the first link 610 at the first point, may be coupled to the upper arm part 200 to allow the movement of the second point spaced apart from the first point to be guided as the upper arm part 200 is rotated about the fixed point 300, and may be coupled to the second end of the elastic body 500 at the third point spaced apart from the first point and the second point. In particular, the first point and the second point may be spaced part from each other in the extension direction of the upper arm part 200. Further, the second link 620 may extend in the extension direction of the upper arm part 200, and the third point may be disposed above or below a line that connects the first point and the second point to form a triangle along with the first point and the second point. In other words, the second link 620 may be a triangular shape or a shape with more corners.

The first point of the second link 620 may be rotatably coupled to the second end of the first link 610 to be guided and simultaneously moved along with the second end of the first link 610. The second point of the second link 620 may be guided by the upper arm part 200 while being moved to maintain a distance from the first point when the first point is moved as the upper arm part 200 is rotated about the fixed point 300.

The third point of the second link 620 coupled to the second end of the elastic body 500 may be determined based on the movement of the first point and the second point of the second link 620 guided by the upper arm part 200. Thus, as the upper arm part 200 is rotated about the fixed point 300, the second end of the elastic body 500 may be moved, and the length of the elastic body 500 may be varied accordingly, and thus, elastic force may be varied. In particular, the elastic body 500 may be a spring having a first end thereof fixedly and rotatably coupled to the upper arm part 200, and the magnitude of the elastic force thereof may be varied in response to variation in length as a second end thereof coupled to the third point of the second link 620 is moved.

Thus, using a durable spring as the elastic body 500, a failure such as wire breakage may be prevented, and it is possible to more easily adjust the elastic force and the magnitude of the resulting torque by replacing the spring. More specifically, the upper arm module may further include, between the second link 620 and the elastic body 500, a third link 630 having a first end thereof rotatably coupled to the second link 620 and a second end thereof coupled to the second end of the elastic body 500. Further, the upper arm module may include, between the elastic body 500 and the upper arm part 200, a fourth link 640 having a first end thereof rotatably coupled to the upper arm part 200 and a second end thereof coupled to the first end of the elastic body 500.

The third link 630 and the fourth link 640 may be rotatably coupled to the third point of the second link 620 and the upper arm part 200, respectively, to allow the length of the elastic body 500 to be varied based on the variation in length between the third point of the second link 620 and the upper arm part 200 or the first end of the elastic body 500 due to the rotation of the upper arm part 200 about the fixed point 300.

In particular, the elastic body 500 may include a plurality of springs with opposite ends thereof coupled to the third link 630 and the fourth link 640, respectively, and the second end of the third link 630 and the second end of the fourth link 640 may extend along a direction in which the plurality of springs are disposed. The plurality of springs may have a same initial length, and may be arranged to allow the magnitudes of the elastic forces based on change in length are symmetrical to each other. Thus, the elastic force generated in the plurality of springs arranged adjacent to each other may be uniformly applied to the third link 630 and the fourth link 640.

Figure 3:
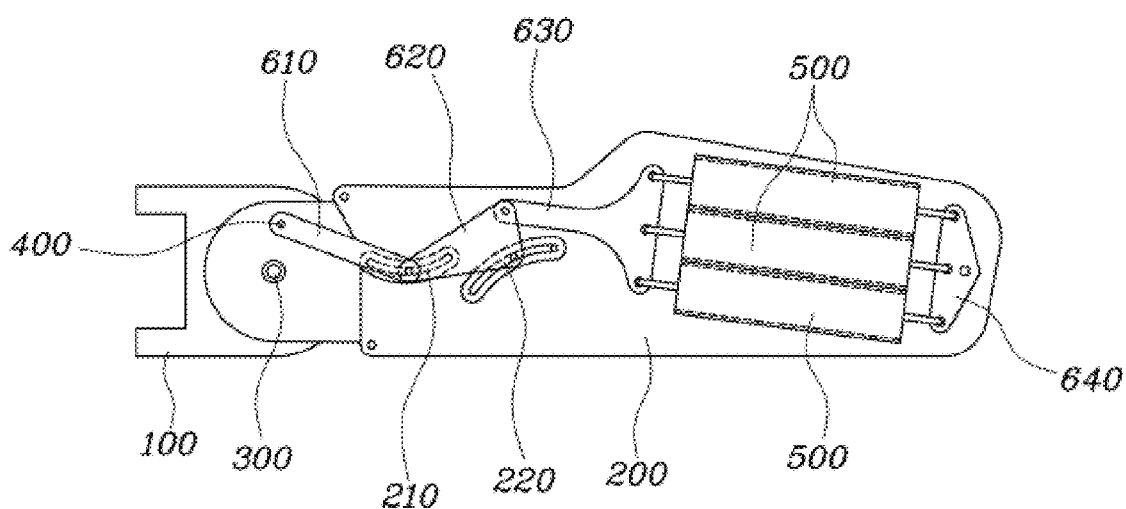
FIGS. 3 and 4 are views showing states of rotation process of the upper arm module of the wearable muscular strength assisting apparatus according to the exemplary embodiment of the present invention.
Figure 4:
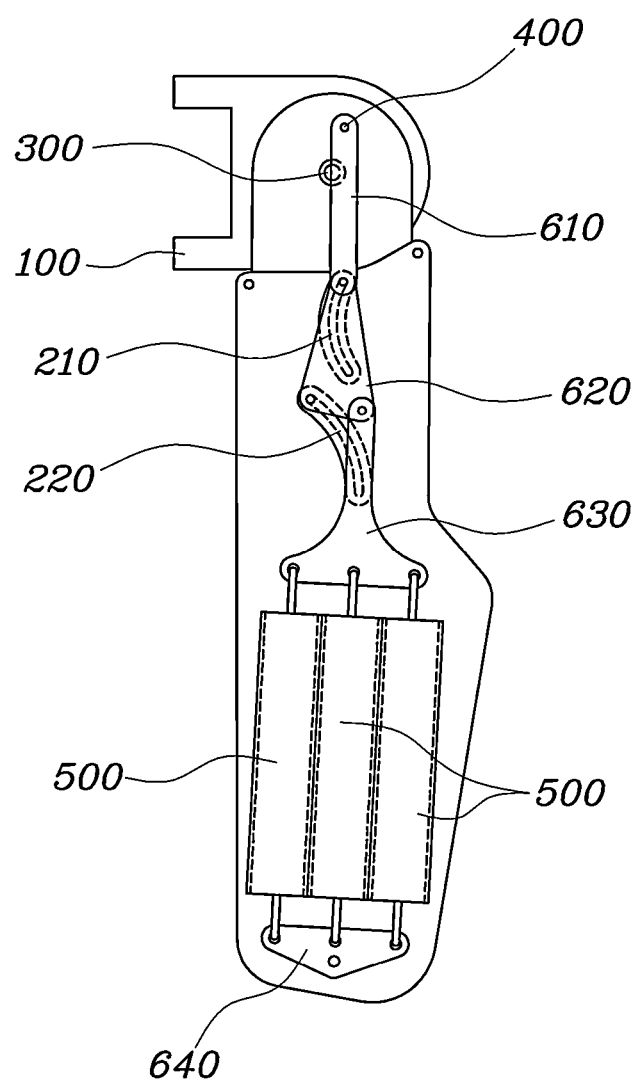

FIGS. 3 and 4 are views showing states of rotation process of the upper arm module of the wearable muscular strength assisting apparatus 1000 according to the exemplary embodiment of the present invention. Referring to FIGS. 3 and 4, the second link 620 may be provided with a first sliding pin (not shown) and a second sliding pin that protrude respectively from the first point and the second point toward a side of the upper arm part 200, and the upper arm part 200 may be provided with a first sliding groove 210 and a second sliding groove 220 into which the first sliding pin (not shown) and the second sliding pin are inserted respectively and slide to guide the movement of the first point and the second point.

The first sliding pin (not shown) may rotatably couple the first point of the second link 620 and the second end of the first link 610 together, and may be slidably coupled in the first sliding groove 210 while freely rotatable in the state of being inserted into the first sliding groove 210 of the upper arm part 200. Further, the second sliding pin (not shown) may be provided at the second point of the second link 620, and may be slidably coupled in the second sliding groove 220 while freely rotatable in the state of being inserted into the second sliding groove 220 of the upper arm part 200. Although not shown, end portions of the first sliding pin (not shown) and the second sliding pin (not shown) may include a bulged portion (not shown) having a size (e.g., diameter) larger than a width of the sliding groove to prevent the sliding pins from being separated from the first sliding groove 210 and the second sliding groove 220.

Figure 5:
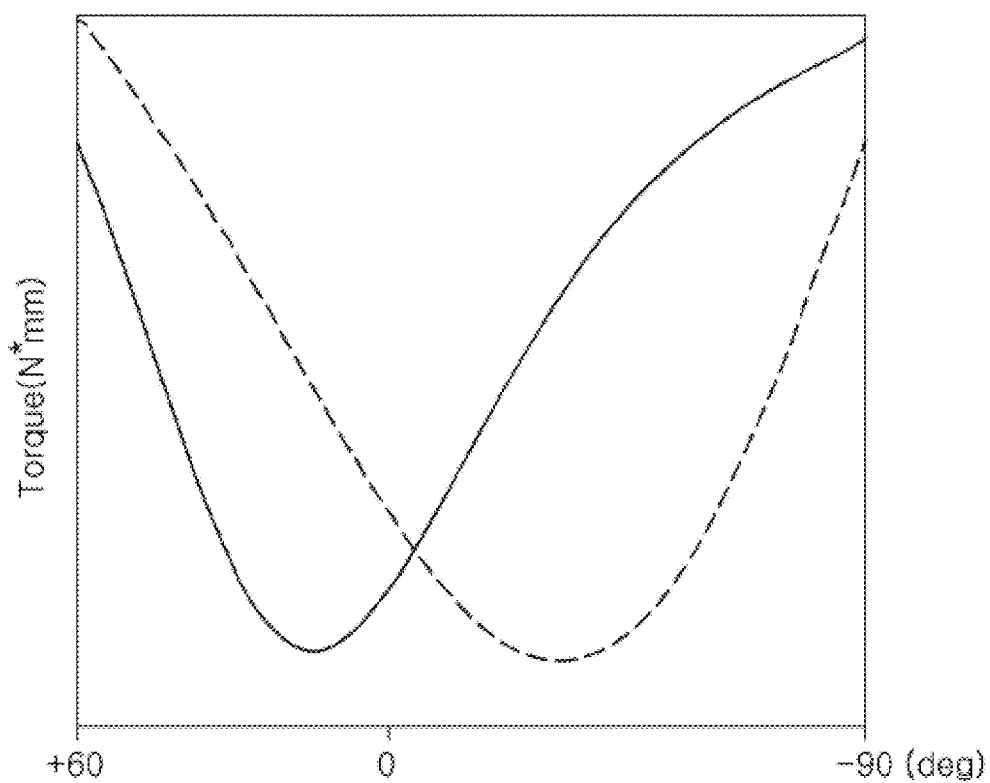
FIG. 5 is a view showing a torque profile of the upper arm module of the wearable muscular strength assisting apparatus according to the exemplary embodiment of the present invention.

FIG. 5 is a view showing a torque profile (solid line) of the upper arm module of the wearable muscular strength assisting apparatus 1000 according to the exemplary embodiment of the present invention. In FIG. 5, the torque profile of the upper arm module according to the present invention is indicated by a solid line, and the torque profile of the conventional upper arm module according to the related art is indicated by a dotted line. Herein, the torque profile graph is mapped using negative numbers less than zero.

The torque generated by the elastic force of the elastic body 500 may be varied as the upper arm part 200 is rotated about the fixed point 300, and may have a profile in which the magnitude (i.e., absolute value of the negative torque) of the torque increases gradually as the upper arm part 200 is rotated downward with respect to the base part 100, has a maximum value at a predetermined angle with respect to the ground, and then decreases again.

In order to compensate for the gravity exerting on the wearer's upper arm, the wearable muscular strength assisting apparatus 1000 supporting the wearer's upper arm is required to be designed to allow the torque for rotating upward to be increased as the wearer's upper arm is moved downward from the state where the wearer's upper arm is upwardly inclined at a predetermined first angle (for example, +60 [deg]) with respect to the ground. Thus, it is possible to compensate for the gravity acting on the wearer's upper arm to support the wearer's upper arm to maintain the upwardly inclined state.

Further, the wearable muscular strength assisting apparatus is required to be designed to allow the rotational torque rotating upward to be decreased as the wearer's upper arm is moved down from a predetermined angle (for example, approximately 0 [deg]) to a predetermined second angle (for example, −90 [deg]). Thereby, the wearer may be prevented from being interfered during the movement of lowering the wearer's upper arm.

Accordingly, in contrast to the torque profile of the conventional upper arm module according to the related art shown by the dotted line, the torque profile of the upper arm module according to the present invention is configured to allow the magnitude to have a maximum value at an angle where the wearer's upper arm is disposed high, and has a minimum value at an angle where the wearer's upper arm is disposed low to favor the lowering motion of the wearer's upper arm.

In order for the torque (solid line) applied to the upper arm part 200 of the present invention to be designed as the above torque profile, the point of application 400 of the present invention may be disposed at a position above the fixed point 300 of the base part 100, to allow the direction from the fixed point 300 to the point of application 400 to form an upward slope with respect to the ground.

The magnitude of the torque applied to the upper arm part 200 or to the base part 100 may be determined by the magnitude of the elastic force and an angle between the direction from the point of application 400 to the fixed point 300 and the direction to which the elastic force is applied from the point of application 400. In particular, the magnitude of the torque may be proportional to the sine of the angle between the direction from the point of application 400 to the fixed point 300 and the direction to which the elastic force is applied from the point of application 400.

More specifically, the point of application 400 may be disposed at a position higher than the fixed point 300 to allow the sine of the angle between the direction from the point of application 400 to the fixed point 300 and the direction to which the elastic force is applied from the point of application 400 to increase gradually as the upper arm part 200 is rotated about the fixed point 300, to have a maximum value when the wearer's upper arm is near a predetermined angle with respect to the ground, and then to decrease again.

In other words, the point of application 400 may be disposed to allow the direction from the fixed point 300 toward the point of application 400 to be upwardly inclined from the ground, and thus, the angle between the direction from the point of application 400 toward the fixed point 300 and the direction to which the elastic force is applied from the point of application 400 may approach O[deg] with the upper arm part 200 maximally rotated upwardly from the ground, approach 90[deg] with the upper arm part 200 near at the predetermined angle, and approach 180[deg] with the upper arm part 200 maximally rotated downwardly.

Figure 6:
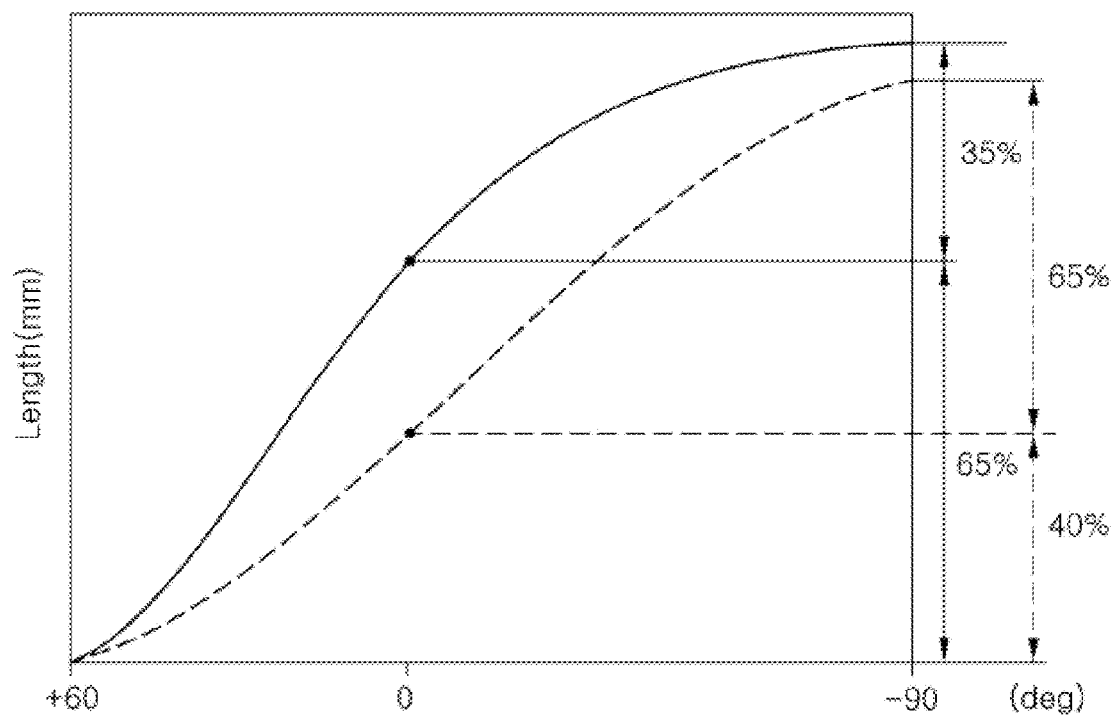
FIG. 6 is a view showing a deformation profile of an elastic body included in the upper arm module of the wearable muscular strength assisting apparatus according to the exemplary embodiment of the present invention.

FIG. 6 is a view showing a deformation profile of the elastic body 500 included in the upper arm module of the wearable muscular strength assisting apparatus 1000 according to the exemplary embodiment of the present invention. More specifically, referring to FIGS. 5 and 6, the solid line graphs of FIGS. 5 and 6 show the torque profile and the deformation profile of the elastic body 500 according to the exemplary embodiment of the present invention, and the dotted line graphs show the torque profile and the deformation profile of the elastic body 500 in the embodiment consisting of the connecting links 610, 620, 630, and 640 without the guide of the first link 610 or the second link 620.

As described below, due to the movement of the first link 610 and the second link 620 according to an exemplary embodiment of the present invention, compared to the embodiment consisting of the connecting links 610, 620, 630, and 640 without the guide of the first link 610 or the second link 620, the elastic force of the elastic body 500 may be effectively utilized in the angular region where the upper arm part 200 is inclined upward from the ground, and the torque may be improved accordingly.

More specifically, the third point of the second link 620 may be disposed at a position higher or lower than a line that connects the first point and the second point to allow the first point, the second point, and the third point to form a triangle, and the movement of the first point and the second point may be guided to allow the second link 620 to be translated and rotated as the upper arm part 200 is rotated about the fixed point 300.

In other words, as the upper arm part 200 is rotated downward around the fixed point 300, the first point and the second point of the second link 620 may be moved toward the fixed point 300 to generate the elastic force, and to vary the change rate in the elastic force based on the angle change of the upper arm part 200, the first point and the second point may be moved to allow the second link 620 to perform not only a translational motion but also a rotational motion. Thus, the third point that forms a triangle along with the first point and the second point may be moved by the translational motion and the rotational motion of the second link 620, and therefore, the change rate in the elastic force based on the angle change of the upper arm part 200 may be varied based on the angle of the upper arm part 200.

More specifically, the third point of the second link 620 may be disposed at a position higher than the line that connects the first point and the second point of the second link 620, and when the upper arm part 200 is rotated downward more than a predetermined angle with respect to the ground based on the base part 100, the movement of the first point and the second point may be guided to cause the third point to be moved downward.

When the upper arm part 200 is rotated downward more than the predetermined angle with respect to the ground based on the base part 100, the second link 620 may be translated toward the fixed point 300 side, and at the same time, may move the third point downward by the rotational motion thereof. As the third point is moved downward, the distance from a position where the second end of the elastic body 500 is fixed may be decreased, thereby offsetting or decreasing the effect of the translational motion of the second link 620 toward the fixed point 300 side.

Accordingly, as shown in FIG. 6, within a range where the upper arm part 200 is rotated downward more than the predetermined angle with respect to the ground based on the base part 100, compared to a range where the upper arm part 200 is rotated upward with respect to the ground, the change rate in length of the elastic body 500 due to the angle change of the upper arm part 200 may be decreased, and thus, the increase rate in elastic force according to the angle change of the upper arm part 200 may be decreased.

In other words, within the range where the upper arm part 200 is rotated downward more than the predetermined angle with respect to the ground based on the base part 100, the torque is more quickly decreased. On the contrary, within the range where the upper arm part 200 is rotated downward from an angle where the upper arm part 200 is inclined upward based on the base part 100 to the predetermined angle with respect to the ground based on the base part 100, the torque is quickly increased.

More specifically, the third point of the second link 620 may be disposed at a position higher than the line that connects the first point and the second point, the second point of the second link 620 may be guided to be gradually more quickly oriented downward while being moved toward the fixed point 300, and the first point may be guided to be oriented downward and then oriented upward while being moved toward the fixed point 300.

The first point and the second point of the first link 610 may be disposed at positions that are spaced apart from the fixed point 300 at a maximum distance with the upper arm part 200 maximally inclined upward based on the fixed point 300. Further, the first point and the second point of the first link 610 may be guided to be close to the fixed point 300 side as the upper arm part 200 is rotated downward about the fixed point 300.

The second point of the second link 620 may be guided to be gradually more quickly oriented downward while being moved toward the fixed point 300. The second point of the second link 620 may be guided to be gradually more quickly moved downward while the third point is moved toward the fixed point 300 as the upper arm part 200 is rotated downward about the fixed point 300.

The first point of the second link 620 may be guided to be oriented downward and then oriented upward while being moved toward the fixed point 300. As the first point of the second link 620 is guided to be oriented downward while being moved toward the fixed point 300, the first point may be guided to be moved downward while the third point is moved toward the fixed point 300 as the upper arm part 200 is rotated downward about the fixed point 300, and may be subsequently guided to be oriented upward while being moved toward the fixed point 300, thereby rotating the second link 620 in a direction where the third point is moved away from the fixed point 300.

Thus, the third point of the second link 620 may obtain the elastic force profile where the change rate in elastic force according to the angle change of the upper arm part 200 is rapidly increased and then decreased as the upper arm part 200 is rotated downward about the fixed point 300, and thus, it is possible to obtain a required torque profile.

Figure 7:
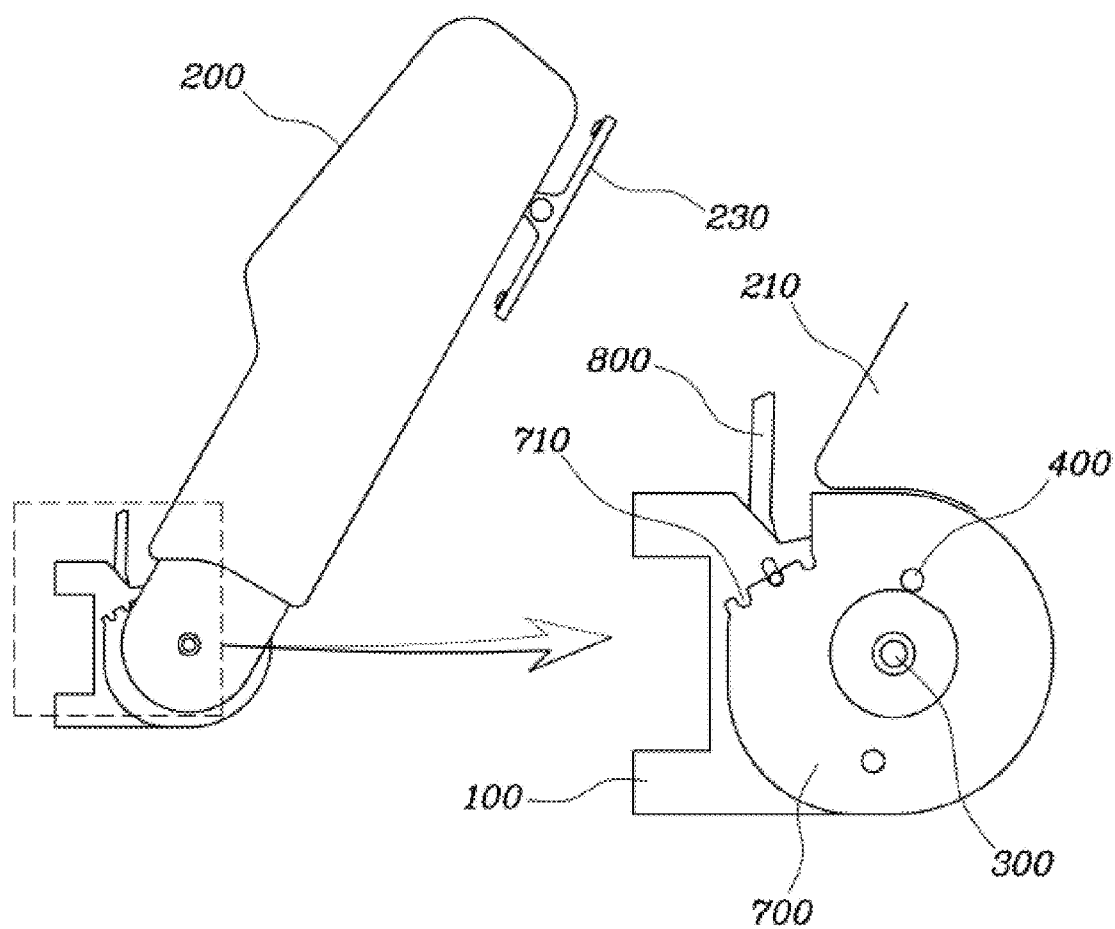
FIG. 7 is a front view showing the exterior of the upper arm module of the wearable muscular strength assisting apparatus according to the exemplary embodiment of the present invention.
Figure 8:
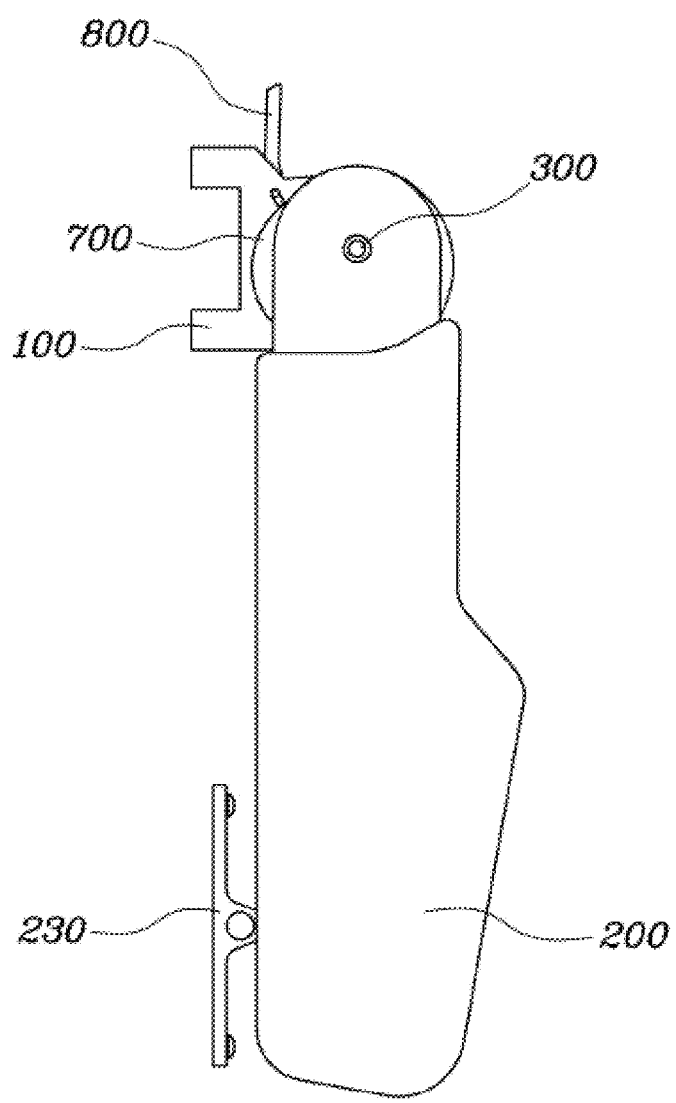
FIG. 8 is a view showing a state where a locking mechanism of the upper arm module of the wearable muscular strength assisting apparatus according to the exemplary embodiment of the present invention is released.

FIG. 7 is a front view showing the exterior of the upper arm module of the wearable muscular strength assisting apparatus 1000 according to the exemplary embodiment of the present invention, and FIG. 8 is a view showing a state where a locking mechanism 800 of the upper arm module of the wearable muscular strength assisting apparatus 1000 according to the exemplary embodiment of the present invention is released. With reference to FIGS. 7 and 8, the upper arm module may further include a rotatable part 700 coupled to the base part 100 to allow a relative rotation with respect to the base part 100 about the fixed point 300. However, the rotation of the rotatable part relative to the base part 100 may be restrained when locked by a locking mechanism 800. The first link 610 may be rotatably coupled to the rotatable part 700 at the point of application 400 to allow the first link 610 and the upper arm part 200 to be rotated simultaneously as the rotatable part is rotated with respect to the base part 100. In other words, the first end of the first link 610 may be directly coupled to the base part 100, or may be coupled thereto via the rotatable part 700.

The rotatable part 700 may be coupled to the base part 100 to be rotatable about the fixed point 300. The rotation of the rotatable part relative to the base part 100 may be restrained when locked by the locking mechanism 800, and the rotatable part may be freely rotated with respect to the base part 100 when the locked state by the locking mechanism 800 is released. The locking mechanism 800 may allow the rotatable part 700 to be locked to the base part 100 at multiple rotation angle points. The rotatable part 700 may be locked to the base part 100 at multiple rotation angle points, and when the rotatable part 700 is rotated with respect to the base part 100 about the fixed point 300, the first link 610 and the upper arm part 200 may be simultaneously rotated along with the rotatable part 700, thereby having an effect that the torque profile of the torque applied to the upper arm part 200 is shifted.

In other words, there is an effect that the torque profile is shifted over an entire range of angles including the predetermined angle that corresponds to a maximum torque. Accordingly, the angular range, in which the torque profile is formed, may be shifted based on the wearer's desire to implement the rotational torque at a desired angle.

More specifically, the locking mechanism 800 may be slidably coupled to the base part 100, and the rotatable part 700 may include a plurality of coupling grooves 710 spaced apart from each other in the rotating direction with respect to the base part 100, and the locking mechanism 800 may be inserted in one of the coupling grooves 710 and engaged therewith to restrain the rotation of the rotatable part 700 relative to the base part 100. The locking mechanism 800 may slide within a coupling slit formed through the base part 100 to be engaged with the coupling grooves 710 of the rotatable part 700 or released from the coupling grooves 710. The locking mechanism may be configured to apply an elastic force in a direction in which the locking mechanism 800 is inserted into the coupling grooves 710 by a separate elastic body having an elastic force.

The base part 100 and the upper arm part 200 may further include a support 230 provided at an outer side of the wearer's upper arm and extending to an inner side of the wearer's upper arm in the upper arm part 200 to surround a lower portion of the wearer's upper arm. The wearer's upper arm may be supported thereunder by the support 230, and thus, the torque applied to the upper arm part 200 may be stably applied to the wearer's upper arm.

Figure 9:
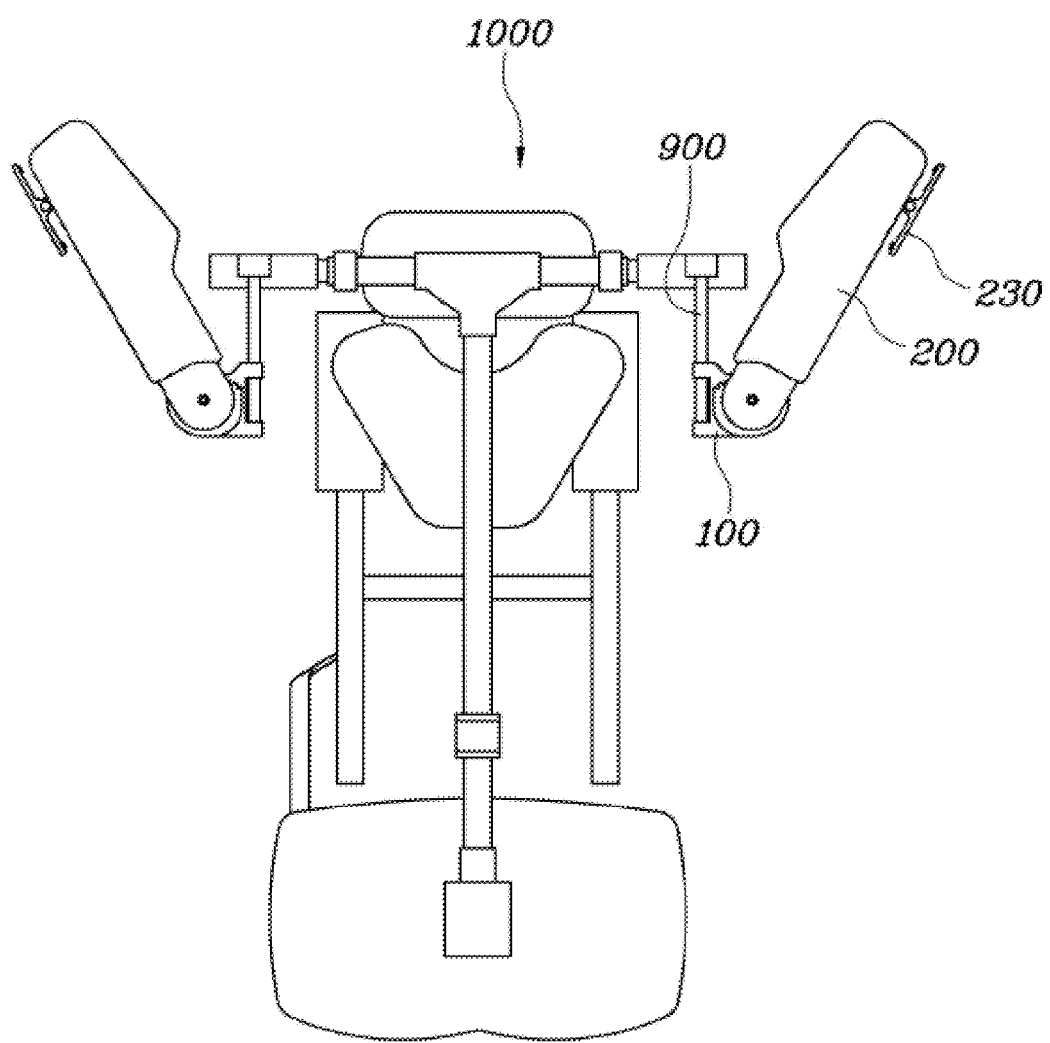
FIG. 9 is a back view showing a wearable muscular strength assisting apparatus including the upper arm module according to an exemplary embodiment of the present invention.

FIG. 9 is a back view showing a wearable muscular strength assisting apparatus 1000 including the upper arm module according to an exemplary embodiment of the present invention. With reference to FIG. 9, the wearable muscular strength assisting apparatus 1000 including the upper arm module according to the exemplary embodiment of the present invention may include the base part 100 coupled to a wearer's torso by a plurality of fastening mechanisms.

More specifically, the wearable muscular strength assisting apparatus may include fastening mechanisms coupled to wearer's shoulder, waist, and the like by harnesses or the like, and the upper arm module of the present invention may be coupled to the wearer's torso by the fastening mechanisms to be fixed to the wearer's torso. In particular, the base part 100 may be coupled to the plurality of fastening mechanisms to be rotatable about a rotating shaft 900 that extends in a vertical (e.g., up-and-down) direction of the wearer. The rotating shaft 900 may be fixed to the wearer's torso by being coupled to the plurality of fastening mechanisms, be disposed at the back of the wearer, and extend in the vertical direction. The base part 100 may be rotatably coupled to the rotating shaft 900 disposed at the back of the wearer, and may extend from the rotating shaft 900 to the outer side of the wearer's upper arm. Accordingly, the wearer may rotate the upper arm upward or downward, and also, may freely perform internal rotation, and abduction movements inward and outward.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An upper arm module of a wearable muscular strength assisting apparatus, the upper arm module comprising:
    a base part connected to a wearer's body, and disposed to correspond to an upper end portion of a wearer's upper arm;
    an upper arm part having a first end thereof coupled to the base part to be rotatable about a fixed point, wherein the upper arm part extends to correspond to the wearer's upper arm and is coupled to the wearer's upper arm to apply a torque to the wearer's upper arm;
    an elastic body having a first end thereof fixedly coupled to the upper arm part at a position spaced apart from the first end of the upper arm part in an extension direction of the upper arm part, wherein the elastic body generates an elastic force by deformation; and
    a connecting link having a first end thereof rotatably coupled to the base part at a point of application spaced apart from the fixed point and a second end thereof coupled to a second end of the elastic body, wherein a length of the elastic body is varied as the upper arm part is rotated about the fixed point.

2. The upper arm module of claim 1, wherein the base part is coupled to the plurality of fastening mechanisms to be rotatable about a rotating shaft that extends in a vertical direction of the wearer.

3. The upper arm module of claim 1, wherein the elastic body is a spring having a first end thereof fixedly and rotatably coupled to the upper arm part, and a magnitude of the elastic force thereof is varied in response to change in length due to movement of a second end thereof coupled to the third point of the second link.

4. The upper arm module of claim 1, wherein the point of application is disposed in the base part at a position above the fixed point, to allow a direction from the fixed point to the point of application forms an upward slope with respect to a ground.

* * * * *